United States Patent Office 2,774,745
Patented Dec. 18, 1956

2,774,745

HIGH-SLIP NITROCELLULOSE LACQUERS

Robert C. Hedlund, Midland, Mich., assignor to Dow Corning Corporation, Midland, Mich., a corporation of Michigan No Drawing. Application November 17, 1952, Serial No. 321,061

4 Claims. (Cl. 260—16)

This invention relates to nitrocellulose based lacquers.

Specifically the invention is concerned with lacquer compositions consisting essentially of (1) 25 to 90 percent by weight nitrocellulose, (2) 10 to 75 percent by weight alkyd resins, (3) .01 to 5.0 percent by weight based on the combined weight of (1) and (2) of an organopolysiloxane fluid boiling above 225° C.

The lacquer compositions of this invention are characterized by a high degree of gloss, permanent slip, weatherability, and water resistance. Lacquer films or coatings having these characteristtics may be obtained without the necessity of any bake and hence are eminently adaptable for application to wood surfaces.

Lacquer films of this invention, due to their excellent permanent slip, require little, if any, waxing to bring about the smooth satiny surface required for wood surfaces such as are found on skis or bowling alleys. The lacquers may also be applied with equally satisfactory results to metal surfaces.

Any nitrocellulose compatible with alkyd resins may be employed herein. Preferred is ¼ or ½ sec. falling ball viscosity regularly soluble (R. S.) nitrocellulose. (The falling ball viscosity method is fully described by J. J. Mattiello in Protective and Decorative Coatings, vol. III, pp. 501–8, published by John Wiley and Sons.)

The term alkyd resin as used in this application refers not only to the well-known alkyd resins of commerce, but also to the silico-alkyd resins described in my copending application, Serial Number 321,060, entitled "Nitrocellulose Lacquers" filed concurrently herewith.

Any commercial alkyd resin suitable for use in nitrocellulose lacquers may be used. Silico alkyd resins, due to their improved moisture resistance and weatherability, are preferred for use herein, particularly if a lacquer for outdoor use is contemplated.

The silico-alkyd resins consist of the reaction product of, for example, the following:

(a) 25 to 90 percent by weight of an organosilicon compound (either organosilanes or partial condensates thereof), having the general formula $R_nSiX_{4-n}$ where R is a monovalent hydrocarbon radical such as, for example, cyclohexyl, methyl, allyl, stearyl, phenyl or xylyl, and X is a hydrolyzable radical such as alkoxy, acyloxy, halogen and amino, or a hydroxy radical, and $n$ has a value of from 1 to 2 inclusive. Suitable organosilicon compounds are, for example, $(CH_3)SiCl_3$, $(CH_3)_2Si(OC_2H_5)_2$
$C_6H_5(C_2H_5)SiBr_2$, $(CH_3)C_6H_5Si(OC_3H_7)_2$
$(C_4H_9)_2Si(OOCCH_3)_2$, $C_2H_5Si(OCH_3)_3$
$(t-C_4H_9)_2Si(NH_2)_2$, $(C_6H_5)_2Si(OH)_2$
$(C_8H_9)CH_3SiCl_2$ (xylyl methyl dichlorosilane), etc.;

(b) 2.5 to 49 percent by weight of glycerine;

(c) 5.2 to 62 percent by weight of dicarboxylic acid (or anhydrides thereof) such as, for example, phthalic acid, terephthalic acid, isophthalic acid, malonic acid, maleic acid and the anhydrides thereof. Most preferred on the basis of availability and cost at the present time is phthalic anhydride. The lower alkyl esters of the dicarboxylic acids such as methyl, ethyl, and amyl esters may, of course, be used with equal ease; and (d) Up to 60 percent by weight of fatty acids having 8–20 carbon atoms, such as, for example, stearic acid, 2-ethyl hexoic acid, tung oil acids, castor oil acids, linseed oil acids, oiticica oil acids, and mixtures of such acids.

As described in the aforesaid copending application, Serial Number 321,060, the reaction residue of the organosilicon component is calculated as

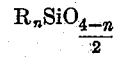

where R is a monovalent hydrocarbon radical and $n$ has a value of from 1 to 2 inclusive. This organosilicon residue must be from 2 to 30 percent by weight of the total weight of the nitrocellulose and silico-alkyd resin. Further details in regard to the preparation and employment of the silico-alkyd resins may be obtained from the said copending application, which is incorporated by reference as a part of this specification.

If desired, mixtures of commercial alkyd resins and the above described silico alkyd resins may be used as the resin component of the lacquers of this invention.

The organo group (attached to silicon) of the organopolysiloxane fluid may be any monovalent hydrocarbon radical such as alkyl, aryl, alicyclic, alkylene, alkaryl, or aralkyl. The organopolysiloxane fluids used are those which boil above 225° C. and preferably those which have methyl and/or phenyl radicals bonded to the silicon atoms. Either cyclic or straight chained organopolysiloxane fluids may be used. Particularly preferred on the basis of commercial availability and cost are the straight chain fluid siloxanes such as dimethylpolysiloxane and/or phenylmethylpolysiloxane. The dimethylsiloxane and phenylmethylsiloxane fluids commercially available consist of linear polymer chains ordinarily end-blocked with triorganosilyl groups such as $R_3Si$—, where R is a monovalent hydrocarbon radical such as methyl, ethyl, or phenyl. The fluids are employed in amount of .01 to 5.0 percent by weight based on the total weight of nitrocellulose and alkyd resin. The advantages of this invention are not obtained if organosilicon fluids are used in amounts outside the stated range. High permanent slip is not obtained if amounts less than .01 percent are employed while if the fluid amounts to more than 5 percent, the lacquer is deleteriously affected often due to incompatibility. The fluids are preferably employed in amount of 0.1 to 2.0 percent by weight. The siloxane fluid may be added at any stage of the formulation of the lacquer. It has been found most convenient to add the siloxane fluid to the otherwise completed lacquer.

The lacquers of this invention are prepared in conventional manner using conventional nitrocellulose lacquer solvents. Inert fillers and drying catalyst may be incorporated into the lacquers of this invention if desired.

This invention, the scope of which is properly set forth in the claims, is illustrated in the following examples.

EXAMPLE 1

The following resin solutions were prepared:

Resin A.—A partially condensed silane was prepared by hydrolyzing a mixture of phenyl methyldimethoxy siloxane and phenyltrimethoxy silane in molar ratio 2:1 with less than the theoretical amount of water required for complete hydrolysis. The partial hydrolyzate (or condensate) was stripped of volatiles such as water and alcohols and contained 20 percent by weight methoxy groups. To 705 grams of this partial hydrolyzate was added 690 grams of a commercial liquid linseed fatty acid having a saponification value of 196.9 to 200.8.

The partial hydrolyzate and fatty acid were heated and stirred at 200° C. whereupon 46 grams of methanol were distilled off. The mixture was cooled to 150° C. and 450 grams of anhydrous glycerine was added and the mixture was again heated to 200° C. to remove 76 grams of methanol. Following this the mixture was cooled to 150° C. and 115 grams of phthalic anhydride was added, whereupon the mixture was again heated to 200° C. to remove volatiles. During the removal of volatiles (135 grams H2O), the mixture was diluted with 150 grams of xylene in order to azeotrope off the water. After volatiles were removed, the mixture was diluted with 67/33 Solveso No. 3-xylene mixture to give a solution containing 50 percent solids. Solveso No. 3 is a high boiling aromatic petroleum solvent manufactured by the Standard Oil Company.

*Resin B.*—Resin B is a commercial, non-oxidizing alkyd containing 45 percent by weight phthalic anhydride and 30 percent by weight non-drying oil acids and having an acid number in the range from 3 to 8. This resin is sold under the name "Rezyl 92–5" in the form of a 60 percent by weight xylene solution. This alkyd resin was diluted to 50 percent solids with xylene.

Resin solutions A and B each were incorporated respectively in the following nitrocellulose lacquer formula:

12.15 g. nitrocellulose, ½ sec. (R. S.)
2.2 g. dibutyl phthalate
27.1 g. toluene
15.6 g. butyl acetate
7.8 g. ethyl acetate
3.55 g. butanol
7.8 g. ethanol
23.8 g. resin solution The resulting lacquers were designated as lacquer A and lacquer B and in each, the solution solids consisted of 50 percent by weight nitrocellulose and 50 percent by weight resin.

EXAMPLE 2

To portions of lacquers A and B were added the following fluids in amount as indicated in Table 1. The percent fluid is based on the total weight of resin and nitrocellulose in the lacquer.

*Fluid 1.*—A commercial trimethylsiloxy end-blocked dimethylpolysiloxane having a viscosity of 12,000 cs. at 25° C. and a boiling point above 225° C.

*Fluid 2.*—A siloxane fluid composed of 10 mol percent phenylmethylsiloxane, 75 mol percent dimethylsiloxane, and 15 mol percent trimethylsiloxane having a boiling point above 225° C.

*Fluid 3.*—A polysiloxane fluid composed of 90 mol percent phenylmethylsiloxane and 10 mol percent trimethylsiloxane having a B. P. above 225° C.

*Fluid 4.*—A polysiloxane fluid composed of 45 mol percent phenylmethylsiloxane units, 45 mol percent dimethylsiloxane units, and 10 mol percent trimethylsiloxane units, and having a boiling point above 225° C.

Metal panels were dipped into the above lacquers and air dried for 24 hours at room temperature to give films of about 1 mil thickness. The films were tested for clearness and slip. Films of lacquers A and B without fluid are included for purposes of camparison.

*Table 1*

| Lacquer | Fluid | Percent fluid | Solution | Film | Slip |
| --- | --- | --- | --- | --- | --- |
| A | | | clear | clear | Poor. |
| A | 1 | 0.1 | do | do | Excellent. |
| A | 2 | 1.0 | sl. haze | sl. haze | Do. |
| A | 3 | 1.0 | clear | clear | Do. |
| A | 4 | 1.0 | do | do | Do. |
| B | 1 | 0.1 | do | do | Do. |
| B | | | do | do | Poor. |

The films of Table 1 were characterized by high gloss, high permanent slip (slipperiness), and high stability towards the effect of water. Slip was determined, not only by running the fingers over the film surface, but by the following test. The coated panel was tilted to an angle of 20° and a cheese cloth covered 100 gm. weight was placed on the high end. If the weight slid off the panel without sticking, the lacquer film was considered to have a high slip. It was found that the weight slid readily over the lacquer films of this invention. The weight failed, however, to slide over the nitrocellulose alkyd lacquer films which did not contain the organosiloxane fluid.

Hardwood flooring coated with the above films remains smooth and satiny for long periods of time without waxing. The need to wax wooden or metal skis is much reduced by lacquering them with the compositions of this invention.

That which is claimed is:

1. A composition of matter consisting essentially of (1) 25 to 90 percent by weight nitrocellulose, (2) 10 to 75 percent by weight alkyd resin compatible with nitrocellulose and (3) .01 to 5.0 percent by weight based on the total weight of (1) and (2) of an organopolysiloxane fluid boiling above 225° C. and in said fluid, the organic radicals are monovalent hydrocarbon radicals which are bonded to silicon atoms by Si-C bonds.

2. The composition of claim 1 wherein (3) is a dimethylpolysiloxane fluid.

3. The composition of claim 1 wherein (3) is a phenylmethylpolysiloxane fluid.

4. The composition of claim 1 wherein the organopolysiloxane fluid is present in an amount of from 0.1 to 2.0 percent by weight based on the total weight of nitrocellulose and resin.

References Cited in the file of this patent

UNITED STATES PATENTS 2,655,489   Lawson _____ Oct. 13, 1953